US006726868B1

(12) United States Patent  
Panfili et al.

(10) Patent No.: US 6,726,868 B1  
(45) Date of Patent: Apr. 27, 2004

(54) DOUBLE MOLDING PROCESS WHEREBY A SIGN IS PRODUCED ON A PRODUCT WHILE SAID PRODUCT IS MOLDED

(75) Inventors: Louis Panfili, Berthierville (CA); François Panfili, Berthierville (CA); Jimmy Petit, St-Hyacinthe (CA)

(73) Assignee: A. Richard, S.E.N.C., Montréal (CA)

( * ) Notice: Subject to any disclaimer, the term of this patent is extended or adjusted under 35 U.S.C. 154(b) by 0 days.

(21) Appl. No.: 09/518,629

(22) Filed: Mar. 3, 2000

(51) Int. Cl.⁷ .............................................. B29C 45/16
(52) U.S. Cl. ..................... 264/247; 264/255; 264/267; 264/328.8
(58) Field of Search ................. 264/247, 246, 264/245, 250, 255, 241, 267, 271.1, 259, 328.8

(56) References Cited

U.S. PATENT DOCUMENTS

| | | | |
|---|---|---|---|
| 49,222 A | * | 8/1865 | Bradley |
| 1,506,014 A | * | 8/1924 | Lindsay |
| 1,512,920 A | * | 10/1924 | Galvan |
| 1,813,797 A | * | 7/1931 | Foley |
| 2,298,365 A | * | 10/1942 | Gits et al. |
| 2,354,857 A | * | 8/1944 | Gits et al. |
| 3,822,107 A | * | 7/1974 | Wogerer |
| 4,155,972 A | * | 5/1979 | Hauser et al. |
| 4,719,063 A | * | 1/1988 | White |
| 5,604,006 A | | 2/1997 | Ponchaud et al. ............. 428/67 |
| 5,673,503 A | | 10/1997 | Rendleman .................. 40/27.5 |
| 5,711,721 A | | 1/1998 | Johnson et al. ............. 473/308 |
| 5,756,029 A | | 5/1998 | Nakamichi et al. ......... 264/161 |
| 5,783,133 A | | 7/1998 | Hara et al. .................. 264/261 |
| 5,794,768 A | | 8/1998 | Skeffington et al. ....... 206/38.1 |
| 5,800,751 A | * | 9/1998 | Barker |
| 5,814,252 A | | 9/1998 | Gouldson et al. .......... 264/40.5 |
| 6,195,830 B1 | * | 3/2001 | Bruschi |
| 6,228,306 B1 | * | 5/2001 | Hoepfl et al. |
| 6,264,869 B1 | * | 7/2001 | Notarpietro et al. |
| 6,368,536 B1 | * | 4/2002 | Hoepfl et al. ................ 264/250 |

FOREIGN PATENT DOCUMENTS

| | | | | |
|---|---|---|---|---|
| JP | 57077548 A | * | 5/1982 | ................. 264/247 |
| JP | 61261014 A | * | 11/1986 | ................. 264/516 |

* cited by examiner

Primary Examiner—Mark Eashoo

(57) ABSTRACT

A double molding process whereby at least one sign is produced on a product while the product is molded. The product has an inner core and an outer cover. In the process, the inner core is molded with a first molding material. The inner core has at least one side provided with a groove in the shape of the sign to be produced. The inner core also has at least one other side provided with at least one channel leading within the inner core to the groove. The outer cover is then molded onto the inner core with a second molding material in such a manner that the one side of the inner core is not covered by the second molding material and thus remains visible. The channel of the other side and the groove of the one side are both filled up with the second molding material to produce the sign on the side of the product. This double molding process allows production of a sign, such as a name, a number, a logo, a trademark, or any other type of symbols conveying information, on a product while the product is molded, the sign lasting all throughout the working life of the product by virtue of its construction.

14 Claims, 10 Drawing Sheets

DOUBLE MOLDING PROCESS WHEREBY A SIGN IS PRODUCED ON A PRODUCT WHILE SAID PRODUCT IS MOLDED

FIELD OF THE INVENTION

The present invention relates to a double molding process. More particularly, the invention relates to a double molding process whereby at least one sign is produced on a product comprising an inner core and an outer cover while said product is molded.

BACKGROUND OF THE INVENTION

It is well known that many companies need to affix visual information on the products they sell so that customers can readily have access to this information. This visual information may be in the form of names, words, numbers, logos, trademarks, or any other type of symbols conveying information.

It is common practice to display such information by means of labels secured to the products or by simply printing the information onto the products. However, very often, the labels are deteriorated or become detached and the prints fade out after a while. Furthermore, this additional step of having to label a product after it has been manufactured constitutes additional costs.

Therefore, it would be very useful to provide a molding process which is capable of producing a sign on a product while said product is molded, the sign lasting all throughout the working life of the product.

U.S. Pat. No. 5,711,721 granted on Jan. 27, 1998 to Brenda JOHNSON et al describes a ferrule for golf clubs. This ferrule is made from a first layer having a raised part and from a second layer molded onto the first layer so as to surround the raised part. This raised part has a different color from that of the second layer and can thus fulfill certain functions, such as displaying a logo or a drawing, or indicating a club number.

U.S. Pat. No. 5,604,006 granted on Feb. 18, 1997 to James A. PONCHAUD et al describes a molding process for making a label bearing article. This process consists of fixing a label by means of an adhesive onto an exterior surface of a thin thermoplastic substrate. The substrate and the affixed label are then placed in a mold cavity of an injection molding device, with the exterior surface bearing the affixed label placed against the wall of the mold cavity. Then, the mold cavity is injected with a molten thermoplastic resin at high pressure which forces the exterior surface of the substrate and the affixed label to be pressed against the wall of the mold cavity, resulting in the affixed label being recessed into the exterior surface and consequently molding the substrate to the label to thus form the label bearing article.

U.S. Pat. No. 5,726,029 granted on May 26, 1998 to Nakamichi et al describes a molding process for producing a molded product containing another molded product. The process consists of initially forming in a first mold a first molded product having interlocking projections and holes. This first molded product is then transferred into a second mold having interlocking grooves and pins and is securely positioned therein by the interlocking of the grooves and pins with the corresponding projections and holes. A molding material is then injected into the second mold so as to form a second molded product containing the first molded product.

Also known to the applicants are the following U.S. patents which describe different processes and apparatuses for producing insignia bearing molded products: U.S. Pat. Nos. 5,673,503; 5,783,133; 5,794,768; and 5,814,252.

None of the above-mentioned patents discloses or suggests a molding process which is capable of producing a sign on a product while said product is molded, said sign lasting, all throughout the working life of the product.

SUMMARY OF THE INVENTION

The object of the present invention is to provide a double molding process which satisfies each of the above mentioned needs.

More particularly, the object of the invention is to provide a double molding process for producing a sign on a product while said product is molded, said sign lasting all throughout the working life of the product by virtue of its construction.

In accordance with the invention, the above object is achieved by a double molding process whereby at least one sign is produced on a product comprising an inner core and an outer cover while said product is molded, said process comprising the steps of:

(a) molding the inner core with a first molding material, said inner core having at least one side provided with at least one groove in the shape of said at least one sign and at least one other side provided with at least one channel leading within the inner core to said at least one groove; and (b) molding the outer cover onto the inner core with a second molding material in such a manner that said at least one side of said inner core is not covered by the second molding material and thus remains visible, and said at least one channel of said at least one other side and said at least one groove of said a least one side are both filled un with said second molding material to produce said at least one sign on said at least one side of the product.

DETAILED DESCRIPTION OF A PREFERRED EMBODIMENT OF THE INVENTION

Figure 1:
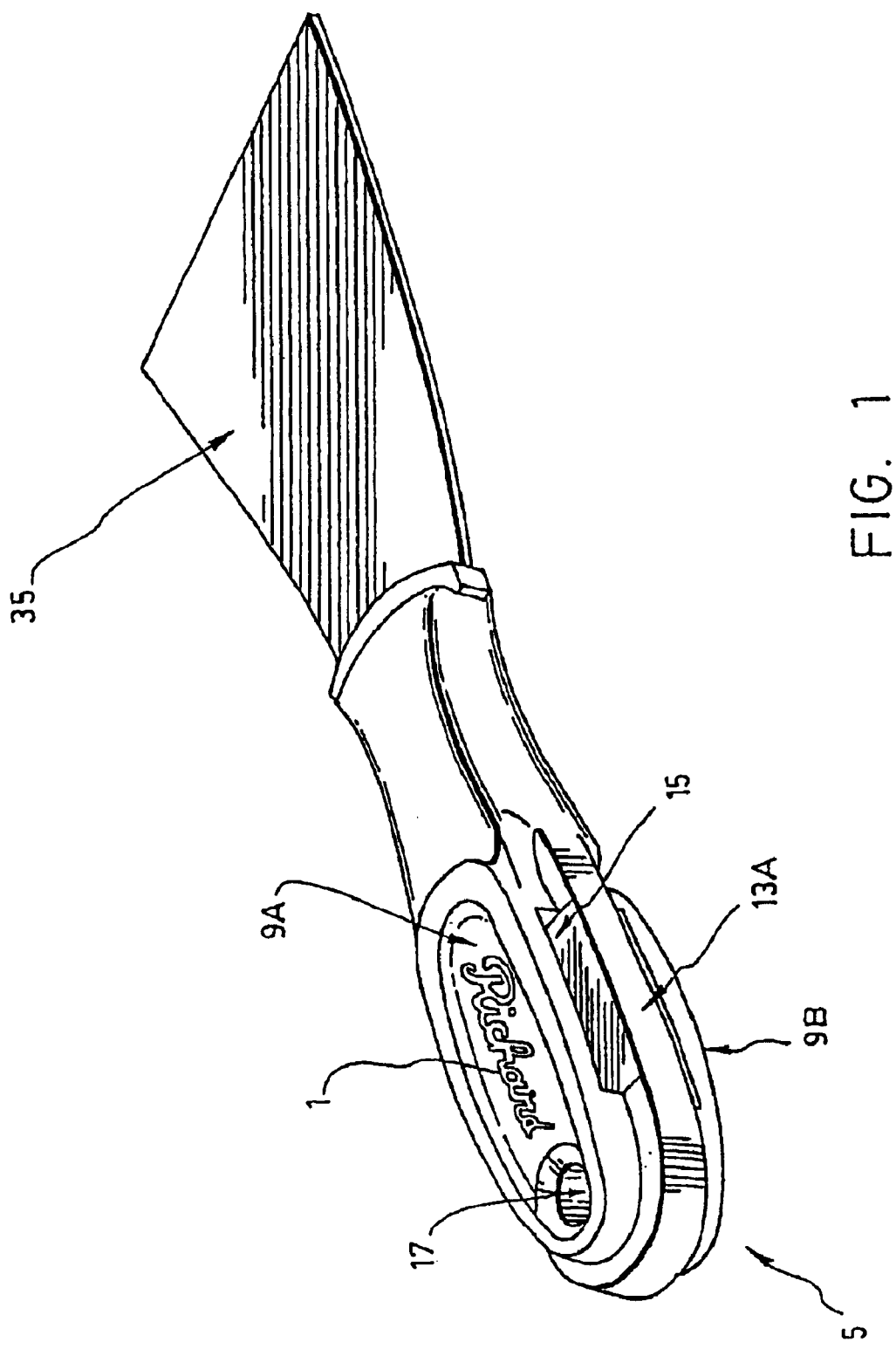
FIG. 1 is a perspective view of the inner core of a product prepared by a double molding process according to a preferred embodiment of the invention.

The double molding process according to the preferred embodiment of the invention as it is illustrated with accompanying drawings is a molding process whereby one or more signs 1, are produced on a product 3 comprising an inner core 5 and an outer cover 7 while the product 3 is molded. Each sign 1 produced on the molded product 3 can be a name like the name "Richard" shown in the drawings, a word, a number, a trademark, or any type of symbol conveying information. The sign 1 produced on the molded product 3 may also be simply used for esthetic reasons in order to attract customers by its visual appearance. The product itself can be the handle of a scraping tool as shown in the drawings. However, the double molding process could also be used to produce signs on various other types of products.

The first step of the double molding process according to the invention consists of molding the inner core 5 with a first molding material. The inner core 5 is molded so that it has at least one side 9 provided with at least one groove 11 in the shape of the at least one sign 1 and at least one other side 13 provided with at least one channel 15 leading within the inner core 5 to the at least one groove 11.

As shown in FIG. 1, the inner core 5 preferably has one top side 9a with several grooves 11 forming the shape of the sign 1 which is the word "Richard". As aforesaid, it is worth reminding that the sign 1 could very well be one or several words, names, numbers, logos, trademarks, symbols conveying information or any combination therefrom. Preferably also, the inner core 5 further has a lateral side 13a provided with one channel 15 leading within the inner core 5 to the grooves 11 of the top side 9a. Consequently, the lateral side 13a and the top side 9a are interconnected through the channel 15 and the grooves 11 so that a molding material forced into the channel 15 may come out of the top side 9a through the grooves 11.

Figure 2:
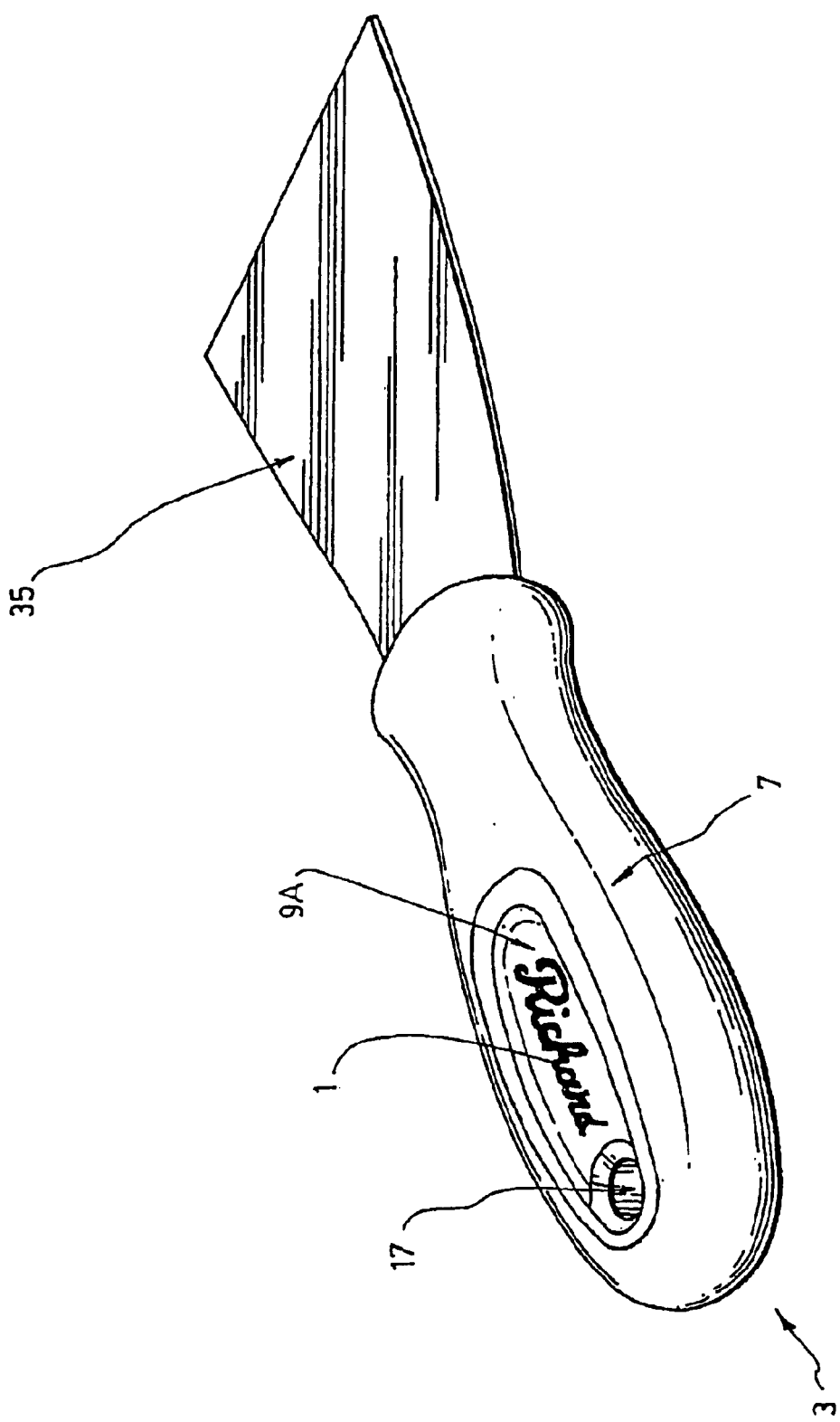
FIG. 2 is a perspective view of the same product after its outer cover has been molded onto the inner core shown in FIG. 1.
Figure 3:
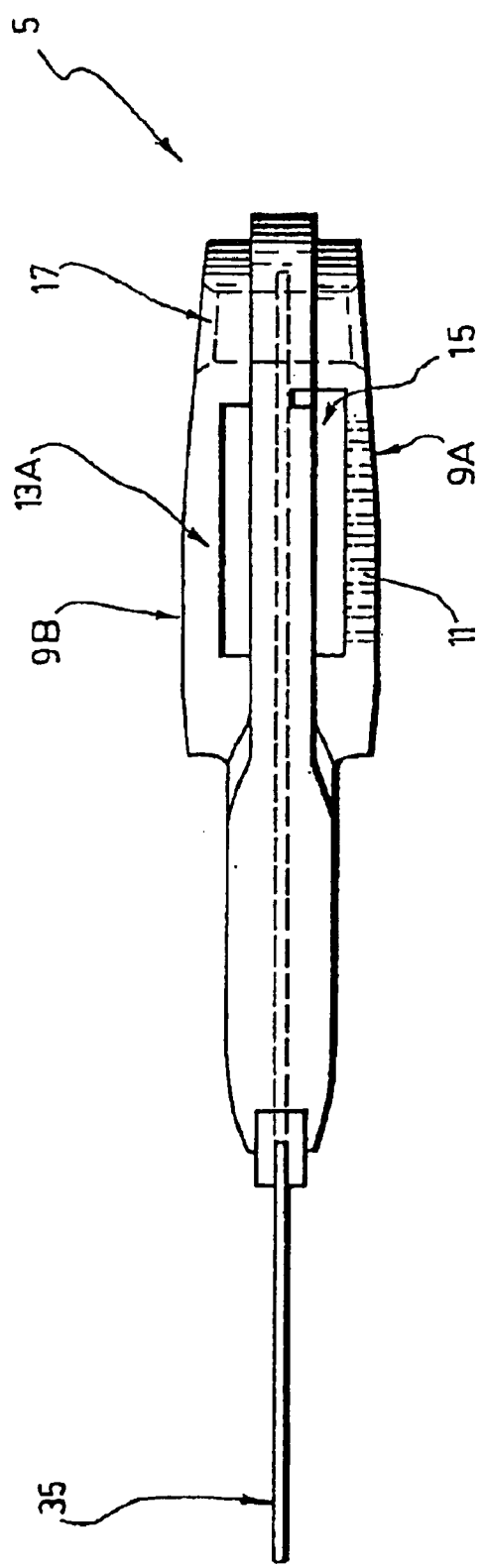
FIG. 3 is a side elevational view of the inner core shown in FIG. 1.
Figure 4:
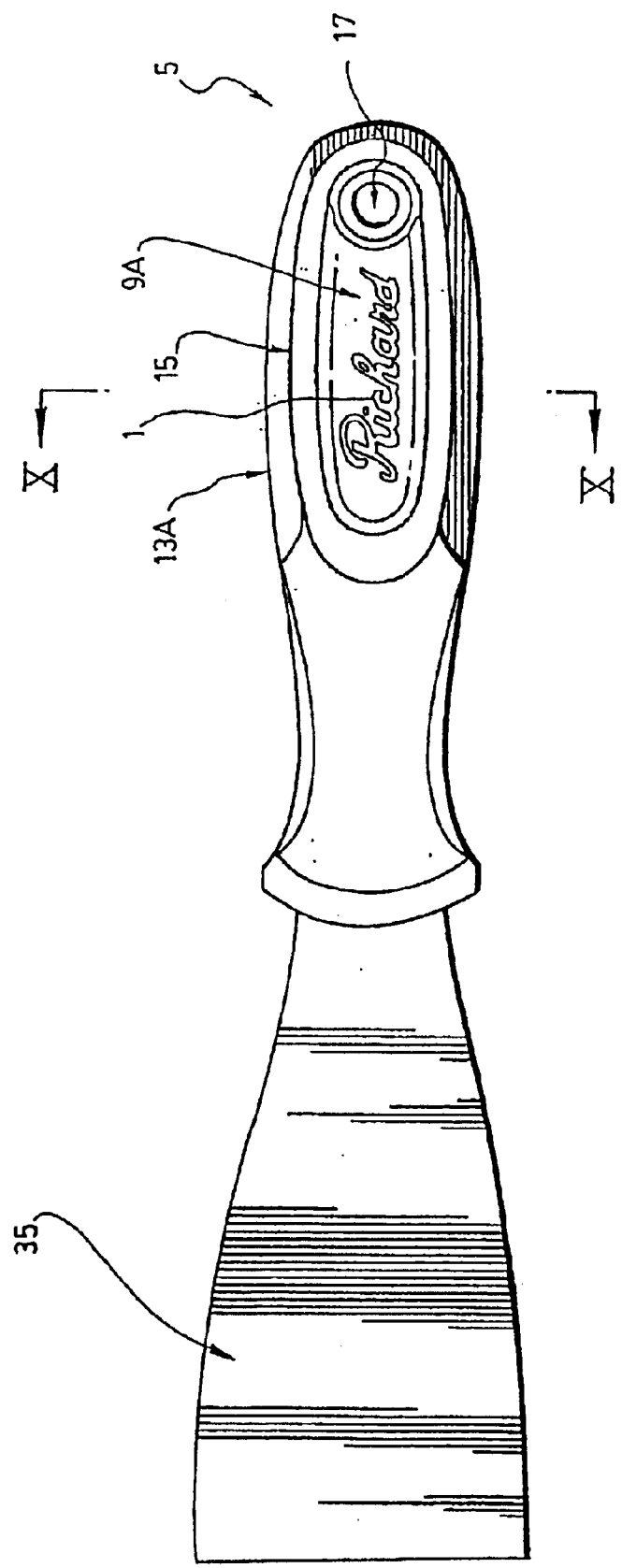
FIG. 4 is a top plan view of the inner core shown in FIG. 1.

The inner core 5 also has a bottom side 9b which is opposite to the top side 9a, as shown in FIG. 3. In the illustrated embodiment, this bottom side 9b has no grooves. However, the bottom side 9b could very well have grooves in the shape of the same sign 1 or in the shape of a different one, these grooves being connected within the inner core 5 to the same channel 15 or to a different one. As shown in FIGS. 1, 3, and 4, the inner core 5 preferably has a hole 17 that runs across it, extending from the top side 9a down to the bottom side 9b. This hole 17 is used to hang the molded product 3 of FIG. 2, which is a tool handle, onto a hook.

The second step of the process according to the invention consists of molding the outer cover 7 onto the inner core 5 with a second molding material in such a manner that the one side 9 of the inner core 5 is not covered by the second molding material and thus remains visible, as better shown in FIG. 2. The channel 15 of the other side 13 and the groove 11 of the one side 9 are both filled up with the second molding material to produce the sign 1 on the side 9 of the product 3.

Figure 5:
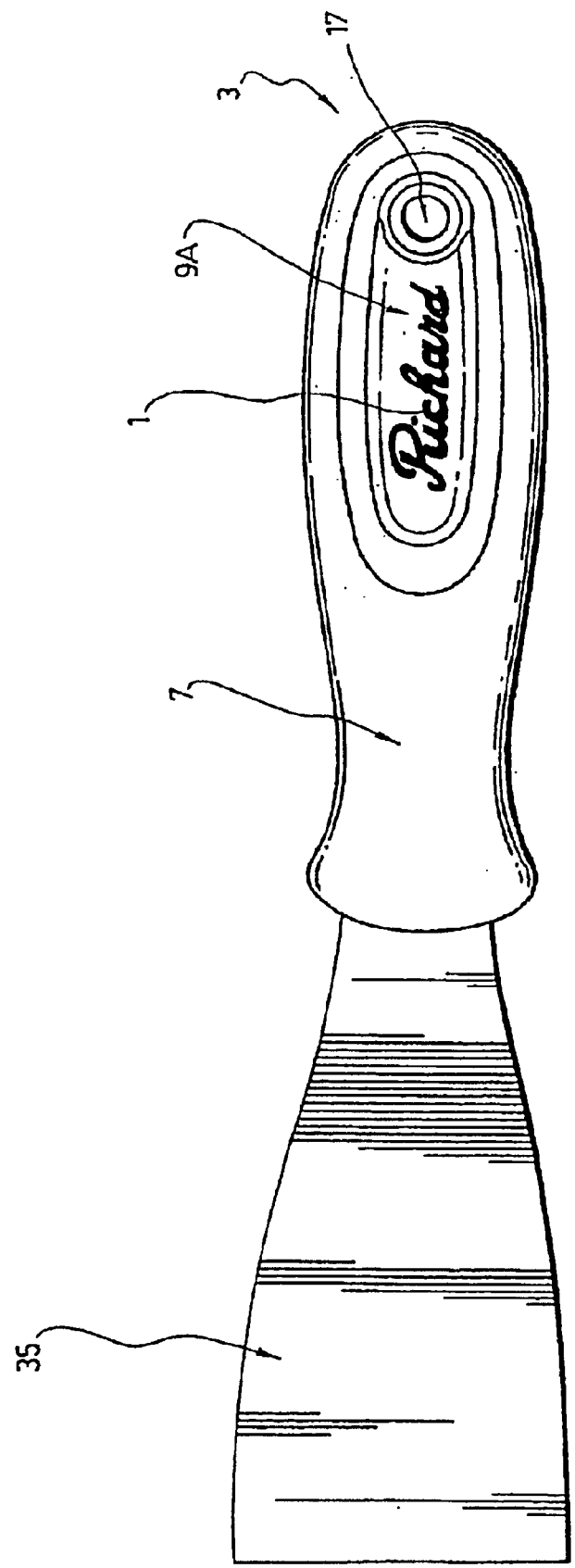
FIG. 5 is a top plan view of the product shown in FIG. 2.

As shown in FIG. 2, the outer cover 7 is molded onto the inner core 5 so as to not cover the top and bottom sides 9a and 9b of the inner core 5. As can be inferred from FIGS. 1, 3 and 4, when molding the outer cover 7 onto the inner core 5, the second molding material enters through the channel 15 and fully fills the grooves 11 within the inner core 5, thereby defining the sign 1 on the top side 9a, as shown in FIGS. 2 and 5.

Preferably, the first step of the double molding process according to the invention comprises the sub-steps of (i) closing a first mold 19 so as to define a first mold cavity 21 in the shape of the inner core 5; (ii) injecting the first molding material into the first mold cavity 21 so as to form the inner core 5; (iii) allowing the inner core 5 to cool to solidify the first molding material; and (iv) opening the first mold 19 to remove the inner core 5.

Figure 6:
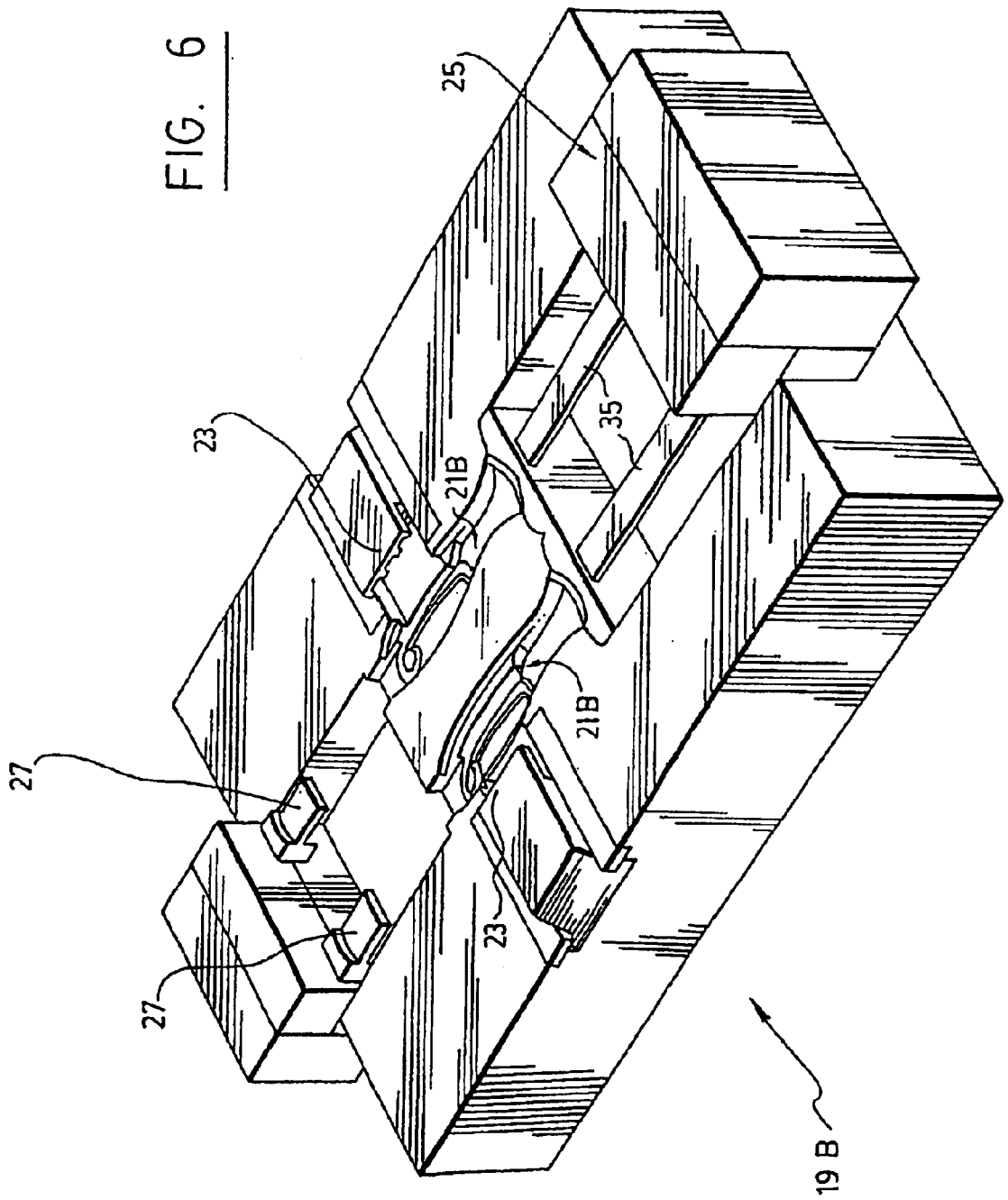
FIGS. 6 and 7 are respectively perspective views of the bottom part and top part of a first mold used to carry out the process according to the preferred embodiment of the invention, the bottom part being shown with retracted inserts and the top part being shown flipped over.
Figure 7:
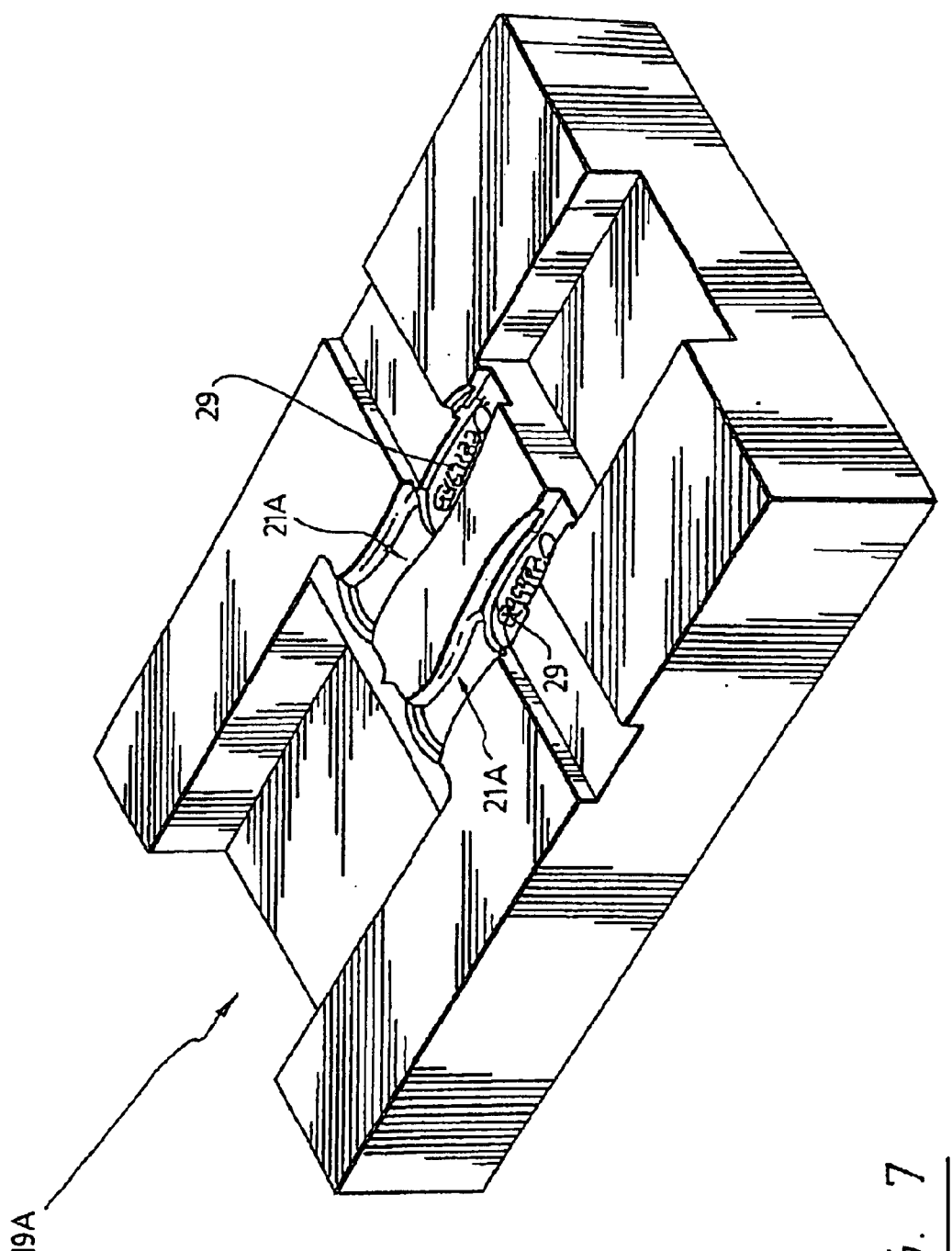
Figure 8:
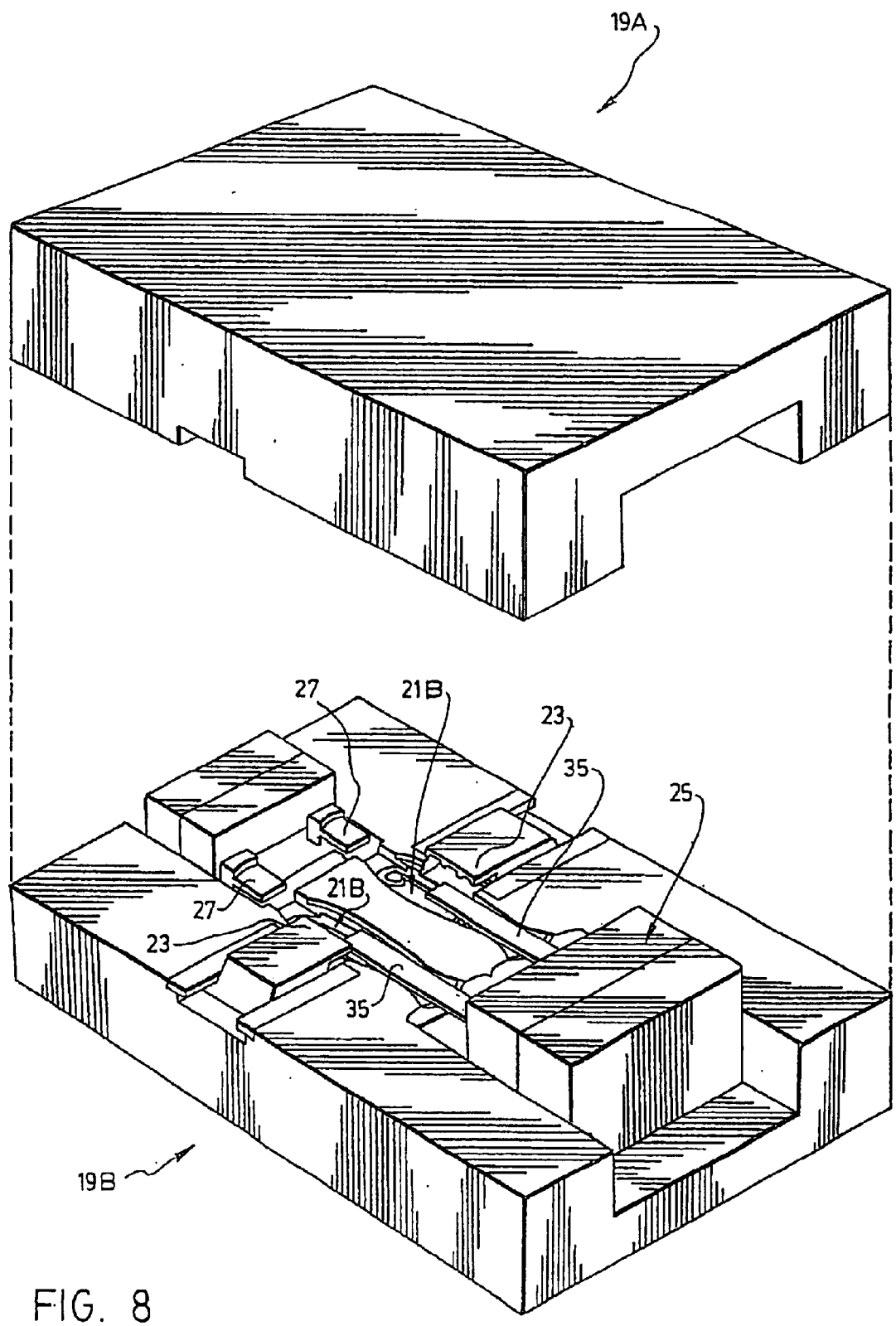
FIG. 8 is an exploded view of the first mold shown in FIGS. 6 and 7.
Figure 9:
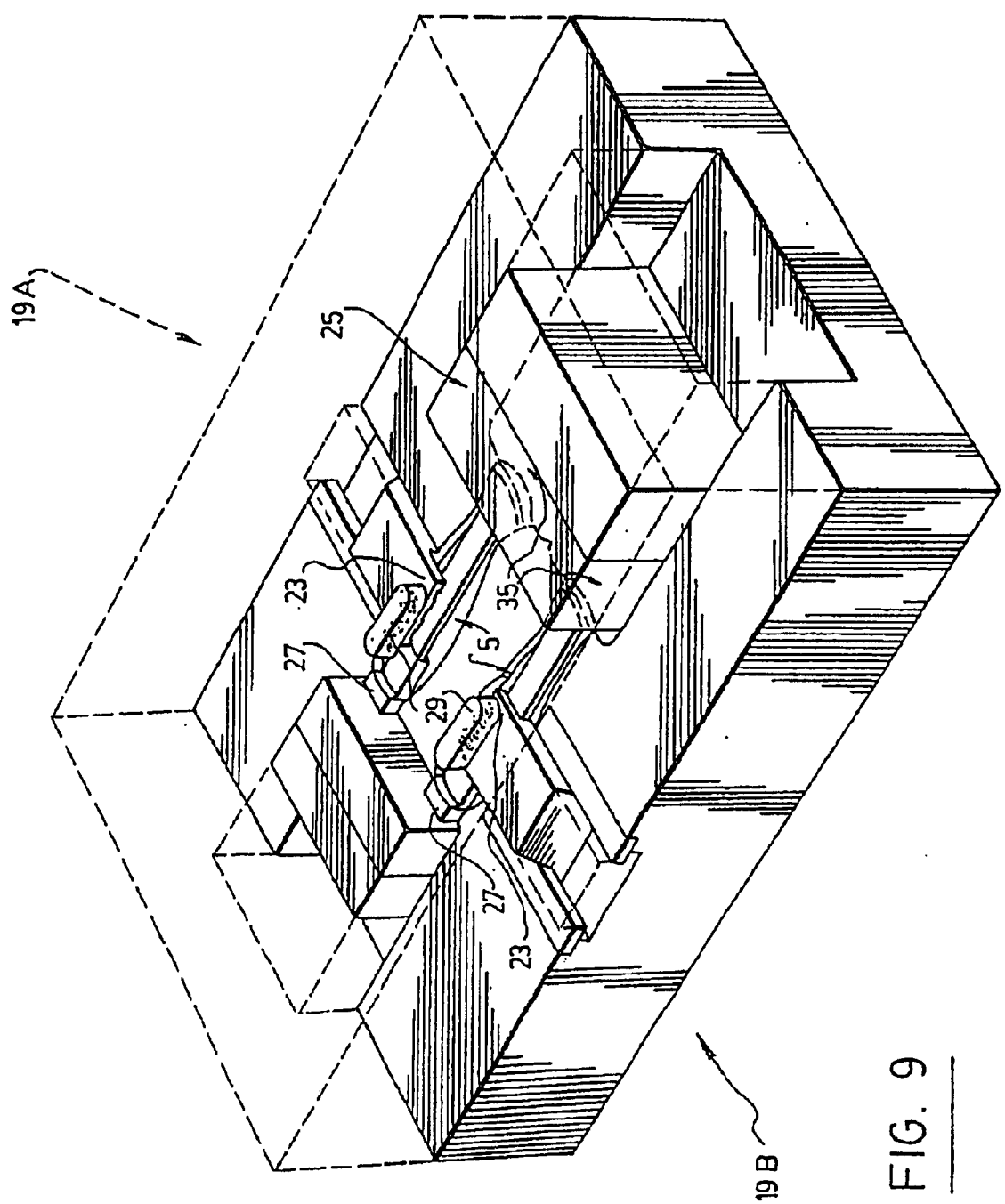
FIG. 9 is a perspective view of the first mold shown in FIG. 8, with the top part shown in FIG. 6 closed onto the bottom part of FIG. 7, and with inserts in position for molding the inner core shown in FIG. 1.

As shown in FIGS. 6 and 7, the first mold 19 comprises a top and a bottom part 19a and 19b, each having cavities 21a and 21b. When the top part 19a is closed onto the bottom part 19b, a top cavity 21a is joined to a bottom cavity 21b so as to define the first mold cavity 21 corresponding to the shape of the inner core 5. Preferably, each part 19a, 19b has movable inserts. As shown in FIG. 6, 8 and 9, the bottom part 19b of the first mold 19 has movable channel inserts 23, movable blade inserts 25, and movable back inserts 27. As shown in FIG. 7 and in FIG. 9, the top part 19a of the first mold 19 has groove inserts 29. The above-mentioned inserts are placed in the position shown in FIG. 9, when the first mold 19 is closed, so as to define along with the top and bottom cavities 21a and 21b, a first mold cavity 21 in the shape of the inner core 5, as shown in FIG. 1.

As shown in FIG. 9, once the first mold 19 is closed and the inserts 23, 25, 27, and 29 are in place so as to define the first mold cavity 21 in the shape of the inner core 5, a molding material is injected into the first mold cavity 21 in order to form the inner core 5. Preferably, the molding material is in the form of a molten resin that is injected through runner channels into the first mold cavity 21 with sufficient heat and pressure to completely fill the mold cavity. Because the resin is molded around the channel insert 23, the channel 15 is defined when the resin has solidified and the movable channel insert 23 is retracted. The grooves 11 of the top side 9a are produced in much the same manner with the grooves insert 29. As molding material, polypropylene is preferably used to form the inner core 5. After the molding material has been injected, it is allowed to solidify. When the material is hardened and after the inserts 23, 25, 27, and 29 are retracted, the first mold 19 is then opened and the inner core 5, as illustrated in FIGS. 1, 3, and 4, is removed. Although the first mold 19 shown in FIGS. 6 to 9 is devised to mold two inner cores 5 at a time, one could have the first mold devised to mold one or more than two inner cores 5 at a same time, using the concepts mentioned earlier.

Preferably, the second step of the double molding process according to the invention comprises the steps of (v) opening a second mold 31; (vi) placing the inner core 5 inside the second mold 31; (vii) closing the second mold 31 so as to enclose the inner core 5 into a second mold cavity 33 defining the shape of the outer cover 7, the second mold 31 being devised to prevent the at least one side 9 of the inner core 5 from being covered by the second molding material during injection of the same; (viii) injecting the second molding material into the second mold cavity 33 to form the outer cover 7 and to fill the at least one channel 15 of the at least one other side 13 and the at least one groove 11 of the at least one side 9 so as to define the at least one sign 1 on the at least one side 9; (ix) allowing the combination of the inner core 5 and outer cover 7 to 5 cool to solidify the second molding material; and (x) opening the second mold 31 to remove the outer cover 7 molded onto the inner core 5.

Figure 10:
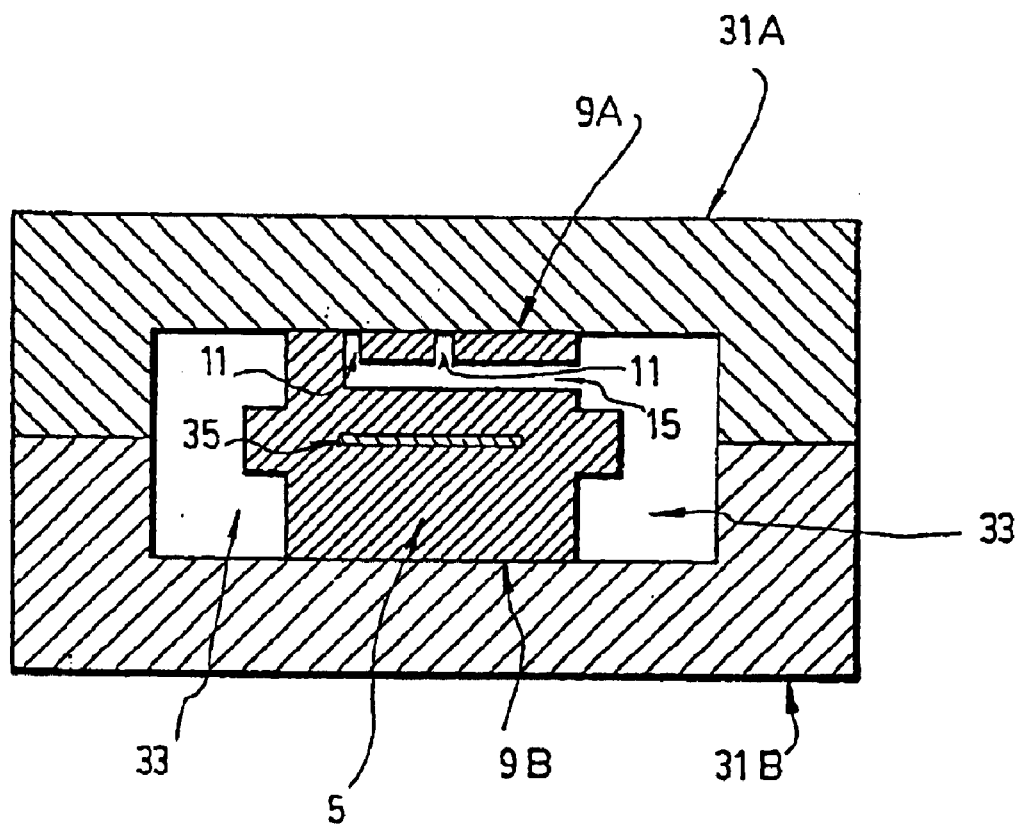
FIG. 10 is a schematic cross-sectional view taken along line XX of FIG. 4 of the second mold used to carry out the process according to the preferred embodiment of the invention, said view showing the inner core positioned inside the second mold.

As shown in FIG. 10, the molded inner core 5 is placed inside the second mold 31 which has a top part 31a and a bottom part 31b. The top part 31a is closed onto the bottom part 31b so as to define the second mold cavity 33 in the shape of the outer cover 7. As can be seen, the top part 31a preferably covers the top side 9a of the inner core 5 so that the second molding material will not come into contact with the top side 9a. The bottom part 31b acts in the same way with the bottom side 19b. Preferably, another molding material is injected through runner channels into the second mold cavity 33 with sufficient heat and pressure so as to completely fill the second mold cavity 33, completely fill the channel 15 and subsequently completely fill the grooves 11. The molding material running through the grooves 11 is stopped at the top side 9a by the top part 31a of the second mold 31, thus defining the sign 1, in this case the word "Richard", on the top side 9a. As molding material, use can preferably be made of a thermoplastic elastomer product sold under the trademark SANTOPRENE® to form the outer cover 7. Preferably also, the first molding material used to mold the inner core 5 has a color different from that of the second molding material so that the sign 1 forms a visual contrast with the top side 9a. By way of example, the inner core 5 can be chosen to be yellow and the outer cover 7 can be chosen to be black.

In the preferred embodiment of the invention illustrated in the drawings, the molded product 3 obtained by the double molding process is a scraping tool which comprises a blade 35 having a portion embedded in the inner core 5. Consequently, sub-step (i) of the double molding process comprises the additional sub-steps of opening the first mold 19; placing the portion of the blade 35 inside the first mold 19; and closing the first mold 19 so as to define the first mold cavity 21 in the shape of the inner core 5.

As shown in FIGS. 6, 7, and 9, the bottom part 19b of the first mold 19 has movable blade inserts 27. The blade insert 27 holds the blade 35 to be embedded inside the inner core 5. Before the inner core 5 is molded, the blade insert 27 positions the portion of the blade to be embedded inside the first mold cavity 21, as shown in FIG. 9. After the inner core 5 has been molded with the blade 35 embedded in it, the outer cover 7 is then molded onto the inner core 5 following the process mentioned earlier. The combination of the outer cover 7 molded onto the inner core 5 then becomes the handle of the scraping tool.

The above-mentioned handle is preferably an ergonomic rubberized handle maximizing grip and reducing hand fatigue. The handle may also have recessed curves for allowing maximum pulling action. Preferably also, the handle has a computer-assisted design maximizing resistance to deflection.

It is worth noting that the above-mentioned double molding process is not limited to scraping tools but could also be used to produce handles for various other types of tools. Ultimately, the double molding process could be used to produce signs on numerous other types of products.

Of course, numerous modifications could be made to the above-described embodiments without departing the scope of the invention as defined in the appended claims.

What is claimed is:

1. A double molding process whereby a sign is produced on a product, the product comprising an inner core and an outer cover, said sign being produced on the product while said product is molded, the sign being a series of alphanumeric symbols, and having a length greater than a width, direction of the sign being the same as the direction of the length of the sign, said process comprising the steps of:
   (a) molding the inner core with a first molding material, said inner core having a top side extending substantially along the direction of the sign and being provided with at least one groove in the shape of said sign, said inner core further having a lateral side adjacent to said top side, said lateral side also extending substantially along the direction of the sign and being provided with at least one channel leading within the inner core to said at least one groove, said at least one channel extending substantially perpendicular to the lateral side and perpendicular to the direction of the sign; and
   (b) molding the outer cover onto the inner core with a second molding material in such a manner that said top side of said inner core is not covered by the second molding material and thus remains visible, and said at least one channel of said lateral side and said at least one groove of said top side are both filled up with said second molding material to produce said sign on said at least one top side of the product.

2. A double molding process according to claim 1, wherein step (a) comprises the steps:
   (I) closing a first mold so as to define a first mold cavity in the shape of the inner core;
   (ii) injecting the first molding material into the first mold cavity so as to form the inner core;
   (iii) allowing the inner core to cool to solidify the first molding material; and
   (iv) opening the first mold to remove the inner core.

3. A double molding process according to claim 2, wherein step (b) comprises the steps:
   (v) opening a second mold;
   (vi) placing the inner core inside the second mold;
   (vii) closing the second mold so as to enclose the inner core into a second mold cavity defining the shape of the outer cover, said second mold being devised to prevent said top side of the inner core from being covered by the second molding material during injection of the same;
   (viii) injecting the second molding material into the second mold cavity to form the outer cover and to fill said at least one channel of said lateral side and said at least one groove of said top side so as to define said sign on said top side;
   (ix) allowing the combination of said inner core and outer cover to cool to solidify said second molding material; and
   (x) opening said second mold to remove the outer cover molded onto the inner core.

4. A double molding process according to claim 3, wherein said product is a scraping tool further comprising a blade having a portion embedded in the inner core, and wherein step (I) comprises the following sub-steps:
   opening the first mold;
   placing the portion of the blade inside the first mold; and
   closing the first mold so as to define the first mold cavity in the shape of the inner core.

5. A double molding process according to claim 1, wherein said inner core further comprises a bottom side being opposite to the top side.

6. A double molding process according to claim 1, wherein said sign produced on said product is selected from the group consisting of names, words, numbers, logos, trademarks and symbols conveying information.

7. A double molding process according to claim 1, wherein said first molding material is polypropylene and said second molding material is a thermoplastic elastomer, and wherein the first molding material has a color different from that of the second molding material so that said sign forms a visual contrast with said top side.

8. A double molding process whereby at least one sign is produced on a handle of a product, along a length of the handle, the handle comprising an inner core and an outer cover, the at least one sign being produced on the handle while said handle is molded, said at least one sign consisting of a series of alphanumeric symbols, and having a length greater than a width, the length of the at least one sign extending substantially along the length of the handle, the process comprising the steps of:

(a) molding the inner core with a first molding material, the inner core having a top side extending substantially along the length of the handle and being provided with at least one groove in the shape of the at least one sign, said at least one groove also extending substantially along the length of the handle, the inner core further including a lateral side adjacent to the top side, said lateral side also extending substantially along the length of the handle and being provided with at least one channel leading within the inner core to the at least one groove; and (b) molding the outer cover onto the inner core with a second molding material in such a manner that the top side of the inner core is not covered by the second molding material and thus remains visible, and the at least one channel of the lateral side and the at least one groove of the top side are both filled up with the second molding material to produce the at least one sign on the top side of the handle;

the improvement wherein the inner core is formed in step a) such that the at least one channel of the inner core extends perpendicularly to the lateral side of the inner core, and thus in a direction substantially traverse to the length of the at least one sign to be produced, so as to facilitate filling of the at least one groove with the second material along the entire length of the at least one sign to be produced, in step b).

9. A double molding process according to claim 8, wherein step (a) comprises the steps:

(I) closing a first mold so as to define a first mold cavity in the shape of the inner core;

(ii) injecting the first molding material into the first mold cavity so as to form the inner core;

(iii) allowing the inner core to cool to solidify the first molding material; and (iv) opening the first mold to remove the inner core.

10. A double molding process according to claims 9, wherein step (b) comprises the steps:

(v) opening a second mold;

(vi) placing the inner core inside the second mold;

(vii) closing the second mold so as to enclose the inner core into a second mold cavity defining the shape of the outer cover, said second mold being devised to prevent the top side of the inner core from being covered by the second molding material during injection of the same;

(viii) injecting the second molding material into the second mold cavity to form the outer cover and to fill said at least one channel of the lateral side and said at least one groove of the top side so as to define the at least one sign on the top side;

(ix) allowing the combination of said inner core and outer cover to cool to solidify said second molding material; and (x) opening said second mold to remove the outer cover molded onto the inner core.

11. A double molding process according to claim 10, wherein said product is a scraping tool further comprising a blade having a portion embedded in the inner core, and wherein step (I) comprises the following sub-steps:

opening the first mold;

placing the portion of the blade inside the first mold; and closing the first mold so as to define the first mold cavity in the shape of the inner core.

12. A double molding process according to claims 11, wherein the inner core further comprises a bottom side being opposite to the top side.

13. A double molding process according 12, wherein the at least one sign produced on the handle is selected from the group consisting of names, words, numbers, logos, trademarks and symbols conveying information.

14. A double molding process according 13, wherein the first molding material has a color different from that of the second molding material so that the at least one sign forms a visual contrast with the top side.

* * * * *